March 24, 1925.  1,530,549

L. W. G. FLYNT

SPARK PLUG

Filed Aug. 16, 1922

Inventor
Louis W. G. Flynt
By Mason, Fenwick & Lawrence
Attorneys

Patented Mar. 24, 1925.

1,530,549

UNITED STATES PATENT OFFICE.

LOUIS W. G. FLYNT, OF NEWARK, NEW JERSEY, ASSIGNOR TO THE DURO COMPANY, OF EAST ORANGE, NEW JERSEY.

SPARK PLUG.

Application filed August 16, 1922. Serial No. 582,184.

*To all whom it may concern:*

Be it known that I, LOUIS W. G. FLYNT, a subject of the King of Great Britain, residing at Newark, in the county of Essex and State of New Jersey, have invented certain new and useful Improvements in Spark Plugs; and I do hereby declare the following to be a full, clear, and exact description of the invention, such as will enable others skilled in the art to which it appertains to make and use the same.

This invention relates to improvements in spark plugs, and has for its object to provide a spark plug which will permit a more rapid firing of the combustible gases than is possible in the present spark plugs, and by this means increase the efficiency and power output of the motor to which they are applied.

I have found that in spark plugs as at present constructed, there is a certain delay in the ignition of the gases. This phenomenon I have found to be due to the fact that in many established arrangements of electrodes there is an interruption of the passage of the flame in such a manner as to form what I have termed "flame shadows," behind the said electrodes, or on that side removed from either of them.

Inasmuch as the flame is generated at, and radiates from a point, the point being the electric spark that passes between the two electrodes where their surfaces are nearest to each other, it will be appreciated that any obstruction to the development of the flame along straight lines will retard its speed by causing it to follow a curved path while propagating into the area shaded by the obstruction. This tends to delay the ignition very materially.

It is an object of the present invention to provide a spark plug which will overcome the condition mentioned and which will allow the spark to radiate in all directions without being materially deflected as is the case in convenional spark plugs. In carrying out the invention, I dispose below the insulated or central electrode a flat electrode so arranged that one edge thereof lies beneath the terminal of the central electrode, the plane of the flat electrode being in the axis of the central electrode.

In the drawings where I have illustrated the application of my invention,—

Figure 1:
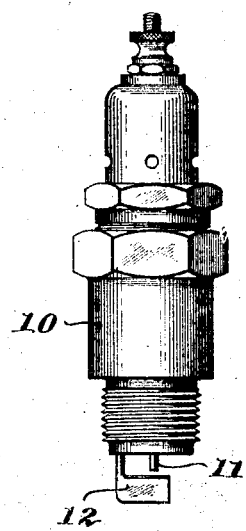
Figure 1 is an elevation of the invention looking at the side of the plate electrode.

In the drawings, 10 designates any suitable form of spark plug and 11 the central or insulated electrode which extends beyond the lower margin of the plug. 12 indicates the grounded electrode which is shown in the form of a flat plate-like member arranged in a vertical plane below the terminal of the electrode 11, said plane being parallel or lying in the axis of the electrode 11. From the drawings it will be clearly seen that the plate electrode 12 is much thinner than the electrode 11.

In view of the fact that the electrode 12 is a relatively thin member arranged on edge with respect to the electrode 11, it will be seen that the flame radiating from the spark passing between the electrodes 11 and 12 may shoot downwardly along the sides of the flat member. Consequently very little, if any, flame shadow is caused by the electrode 12.

Figure 4:
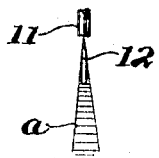
Fig. 4 is a diagram illustrating how the invention reduces flame shadow.
Figure 5:
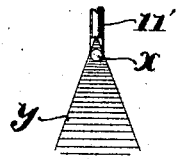
Fig. 5 is a diagram showing how the conventional spark plug causes a large flame shadow.
Figure 2:
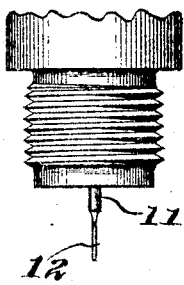
Fig. 2 is a view at right angles to Fig. 1.
Figure 3:
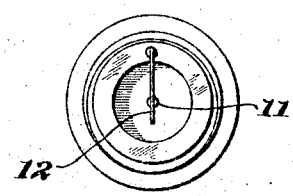
Fig. 3 is a bottom plan view of the spark plug.

In Fig. 5, I have diagrammatically illustrated an electrode *x* of the conventional round style. The flame which radiates from the electrode 11' meets the electrode *x* which forms an obstruction to flame propagation with the resultant flame shadow shown by sector *y*. In Fig. 4, the improved spark plug is shown and it will be noted that the flame shadow sector *a* is much less width than sector *b*. I have found that an internal combustion engine functions more efficiently with my improved spark plug, and this I attribute to the improved form of electrode 12 which as already indicated, produces a minimum of flame shadow.

The electrode 12 is made of sufficient depth to give suitable rigidity to the same and may be connected to the lower edge of the spark plug body in any suitable manner.

What I claim is:

In a spark plug, the combination of a centrally disposed electrode and a cooperating relatively thin substantially rectangular shaped electrode below said first mentioned electrode extending in a parallel plane to the axis thereof, said lower electrode being thinner than said central electrode and of considerable depth, whereby flame shadows will be reduced to a minimum.

In testimony whereof I affix my signature.

LOUIS W. G. FLYNT.